2 Sheets—Sheet 1.
H. GREEN.
Harvester.
No. 564. Reissued May 25, 1858.
Fig. 1,
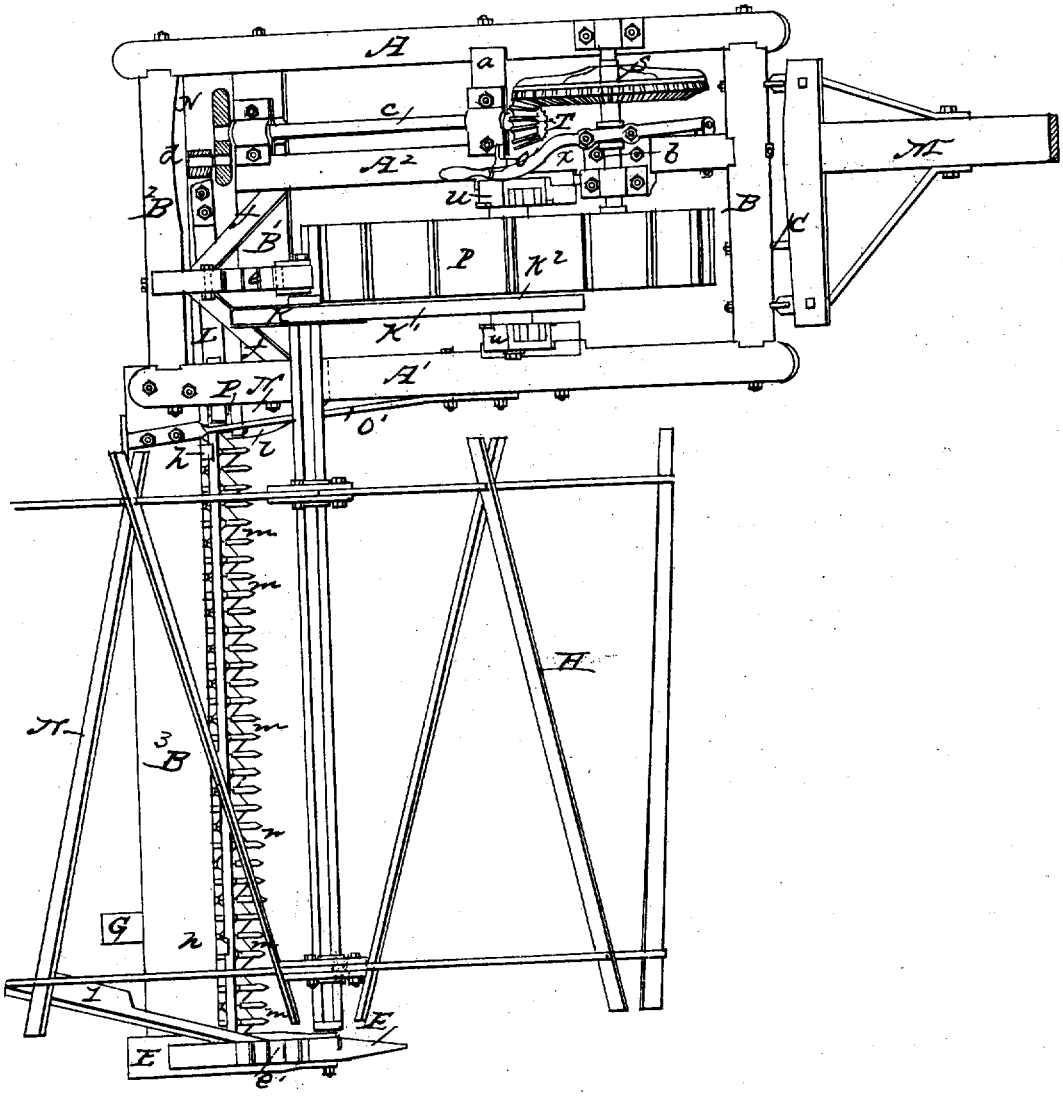
N. PETERS, Photo-Lithographer, Washington, D. C.

2 Sheets—Sheet 2.
H. GREEN.
Harvester.
No. 564.
Reissued May 25, 1858.
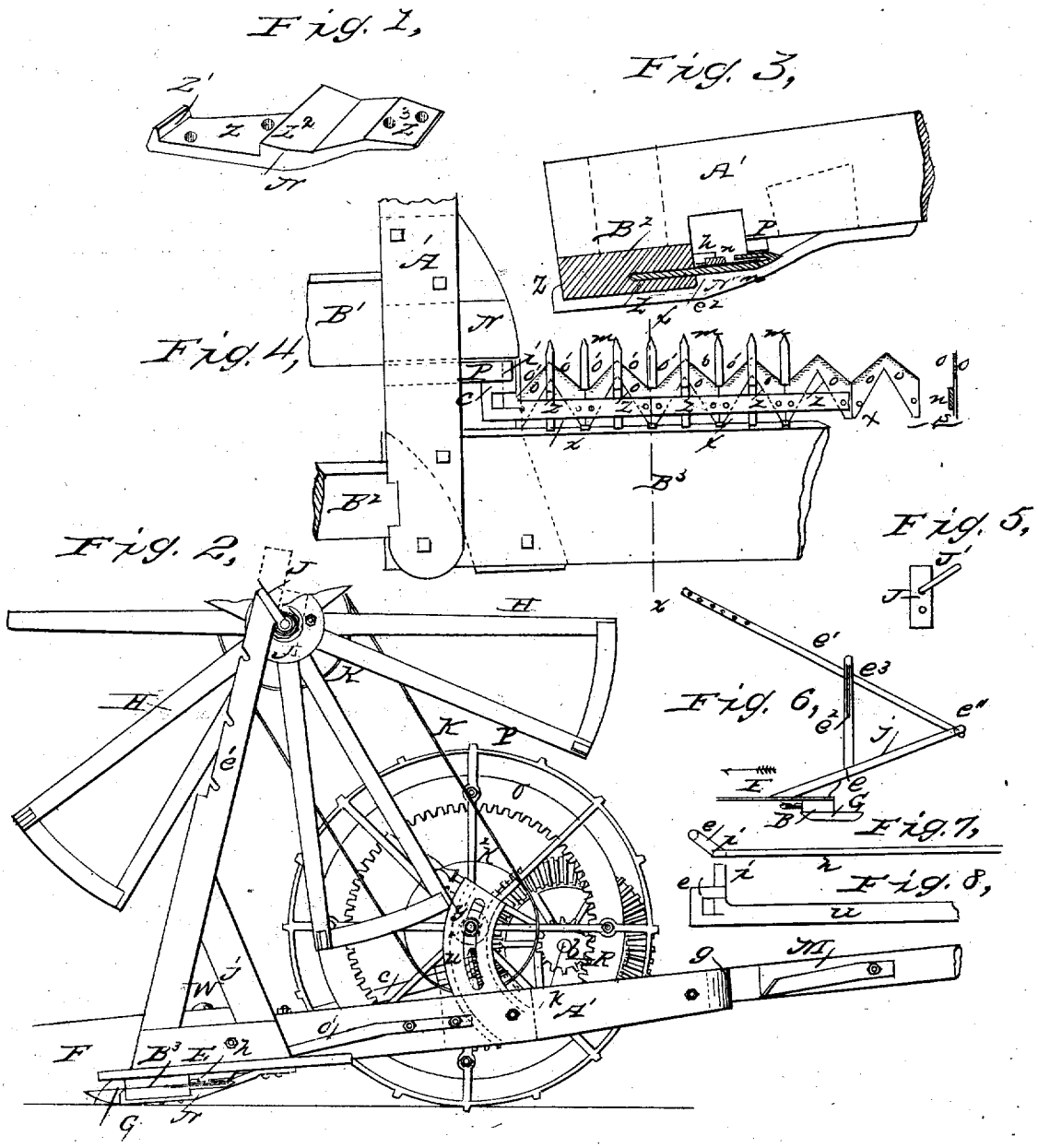
N. PETERS. Photo-Lithographer, Washington, D. C.

UNITED STATES PATENT OFFICE.

HENRY GREEN, OF OTTAWA, ILLINOIS.

IMPROVEMENT IN CUTTING DEVICES FOR HARVESTERS.

Specification forming part of Letters Patent No. 10,657, dated March 21, 1854; antedated September 21, 1853; Reissue No. 564, dated May 25, 1858.

DIVISION No. 4.

*To all whom it may concern:*

Be it known that I, HENRY GREEN, of Ottawa, in the county of La Salle and State of Illinois, have invented certain new and useful Improvements in Harvesting-Machines, of which the following is a full, clear, and exact description, reference being had to the accompanying drawings, which make part of this specification, and in which—

Figure 1 represents a plan of a harvesting-machine (as arranged for mowing grass) which embraces my improvements. Fig. 2 represents an elevation of the machine as seen when looking at it toward that end which runs next the standing grain or grass. Fig. 3 represents a section through the finger-beam at the line *x x* of Fig. 4 and an elevation of the shoe and of the adjacent parts of the frame, showing principally the manner in which the finger-beam is connected by means of the shoe to the frame. Fig. 4 represents a plan of the parts shown in Fig. 3. Fig. 5 represents a box, J, for the journal of the reel-shaft and a stirrup, J′, for suspending this box to the reel-post. Fig. 6 represents an arrangement of inclined arms which is deemed preferable in most cases to the post shown in Figs. 1 and 2 for supporting the axle of the reel over the divider. Fig. 7 represents an elevation of the back, and Fig. 8 a plan of that end of the bar *n* of the sickle which is shown in Fig. 4; and Fig. 9 represents a view in perspective of the shoe for connecting the finger-beam and gear-frame.

Of the above-mentioned figures, 1, 2, and 5 are made according to the scale of feet represented on the drawings, Figs. 3, 4, 7, and 8 upon a larger and Fig. 6 upon a smaller scale, and Fig. 9 upon a scale different from that of any of the rest of the figures.

The vibrating cutter of harvesting-machines as heretofore constructed is more or less liable to be impeded in its action and clogged by an accumulation of fine grass, leaves, &c., about and around the guard-fingers and the back of the cutter, which plays across the guard-fingers; and the object of my invention is to construct the cutter of such form that it will detach and throw off any such obstructing matter as may tend to fasten upon it or upon the guard-fingers; and to this end my invention consists of a cutter having any proper form of edge in front for severing the stalks of grass or grain, and constructed with notches or indentations in the rear of such cutting-edge, the sides of such notches or indentations acting against and passing over the fingers or guards in such wise as to pull or drag off or cut up and drag off obstructing matter; and my invention of such indentations or notches in the back of the cutter is irrespective of the breadth or depth thereof and of the sharpness or bluntness of their sides or edges. I however deem it preferable to sharpen the rear extremity of the notches and the back edge of the blade between the notches, thus in fact making a cutter with front and rear cutting-edges, which double-edged cutter, irrespective of the form of its edges and the mode of sharpening them, is the subject of the second branch of my invention.

The improvements which I claim herein are exhibited in the drawings as applied to a complete mowing-machine; but as the invention herein claimed relates solely to the form of the cutter and is applicable to all reaping and mowing machines using a vibrating cutter, I deem it unnecessary to describe particularly the frame of the machine, the reel, or the gearing that gives motion to the cutter and to the reel, as the details of construction of such parts of the machine have no bearing upon the invention claimed herein.

A vibrating cutter having a scalloped cutting-edge of the usual form in front is shown in the drawings, which cutter embodies the improvements which I herein claim. This cutter also embraces the arrangement of the blade of the cutter so as to overhang the back of the bar to which it is attached, which arrangement is the subject of another patent.

The blade of the cutter is made up of a series of cutting-teeth, O, riveted to a bar, *n*, which is the mode of construction that I prefer. These cutting-teeth O are made of plate-steel, flat or plane on one side, and at their front edges, *o′*, beveled off and scored or sickled, as represented, to form the front cutting-edge of the sickle. The rear edge of the blade is formed into notches or indentations the sides *x* of which may be either blunt or sharp, as they work well in either case; but I prefer to sharpen them. I also prefer to sharpen the rear edge of the blade between the notches, as the sharpened edges act with greater efficiency in detaching obstructions from both the back of the cutter and the guard-fingers. Fig. 4 represents these improvements more distinctly than they are shown in some of the other figures.

The cutter is arranged to play through a series of guard fingers, *m*, of the usual construction, which project in front of the finger-beam, and as it plays through these fingers the sides of the notches or indentations and the corners of the fingers reciprocally catch the obstructing matter and tear it off when the sides of the notches or indentations are not sharpened; but when they are sharpened the obstructing matter will be cut to facilitate its removal.

What I claim under this patent as my invention is—

1. A vibrating cutter having any proper form of cutting-edge in front and notched or indented in the rear thereof, in combination with guard-fingers, across which it vibrates, substantially as herein set forth.

2. The combination of a cutting-edge at the front of a vibrating cutter for severing the stalks of grass or grain, with a cutting-edge at the rear for cutting up and facilitating the discharge of obstructing matter, substantially as herein set forth.

In testimony whereof I have hereunto subscribed my name.

HENRY GREEN.

In presence of—
P. H. WATSON,
HENRY BALDWIN, Jr.